(12) United States Patent
Allen

(10) Patent No.: US 9,813,306 B1
(45) Date of Patent: Nov. 7, 2017

(54) RESPONSE RATE LIMITING DEVICE

(71) Applicant: Amazon Technologies, Inc., Seattle, WA (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 517 days.

(21) Appl. No.: 14/571,810

(22) Filed: Dec. 16, 2014

(51) Int. Cl.
*G06F 15/173* (2006.01)
*H04L 12/24* (2006.01)

(52) U.S. Cl.
CPC .................... *H04L 41/50* (2013.01)

(58) Field of Classification Search
CPC ...... H04L 41/50; H04L 41/0896; H04L 47/10
See application file for complete search history.

(56) References Cited

U.S. PATENT DOCUMENTS

2005/0111367 A1* 5/2005 Jonathan Chao ... H04L 63/1458 370/235
2008/0028467 A1* 1/2008 Kommareddy ..... H04L 63/1458 726/23

\* cited by examiner

*Primary Examiner* — John B Walsh
(74) *Attorney, Agent, or Firm* — Davis Wright Tremaine LLP

(57) ABSTRACT

A response rate limiting device is provided in order to reduce a volume of data which may correspond to amplification attack. The rate liming device may receive a set of packets and determine identification information corresponding to the packets. The rate limiting device may then update a score associated with the determined identification information, the score may be maintained in a buffer. If the score information is above a threshold, the rate limiting device determine to delay a response associated with the identification information.

20 Claims, 9 Drawing Sheets

RESPONSE RATE LIMITING DEVICE

BACKGROUND

Computing resource service providers may offer a variety of services to customers accessible over a network, such as the Internet. Customers may transmit requests to the computing resource service provider and the computing resource service provider may response with information associated with the request. In certain situations the response may be disproportionately larger, in terms of an amount of data, than the request provided by the customer. Attackers may use this disproportionately larger response in order to flood computing resources of a target. These types of attacks are referred to as amplification attacks.

An amplification attack is a popular form of Distributed Denial of Service (DDoS), in which attackers use publically accessible open computing resources of a computing resource service provider to flood or otherwise overload a target system with response traffic. Certain attack techniques consist of an attacker sending a Domain Name Server (DNS) name lookup request to an open DNS server with the source address spoofed as the target's address. When the DNS server sends the DNS record response, it is sent to the target instead of the attacker as a result of the spoofed address. Attackers will typically submit a request for as much information as possible to maximize the amplification effect. Furthermore, attackers may transmit similar requests to multiple computing resource service providers in order to increase the amount of response traffic to the target. Since the size of the response is considerably larger than the request, attackers are able to increase the amount of traffic directed at the target with little overhead on the computing resources of the attacker. By leveraging a botnet to produce a large number of spoofed requests, attackers can create a large amount of traffic with little effort. Additionally, because the responses are legitimate data coming from valid servers, it is extremely difficult to prevent these types of attacks.

BRIEF DESCRIPTION OF THE DRAWINGS

Various embodiments in accordance with the present disclosure will be described with reference to the drawings, in which.

DETAILED DESCRIPTION

Figure 1:
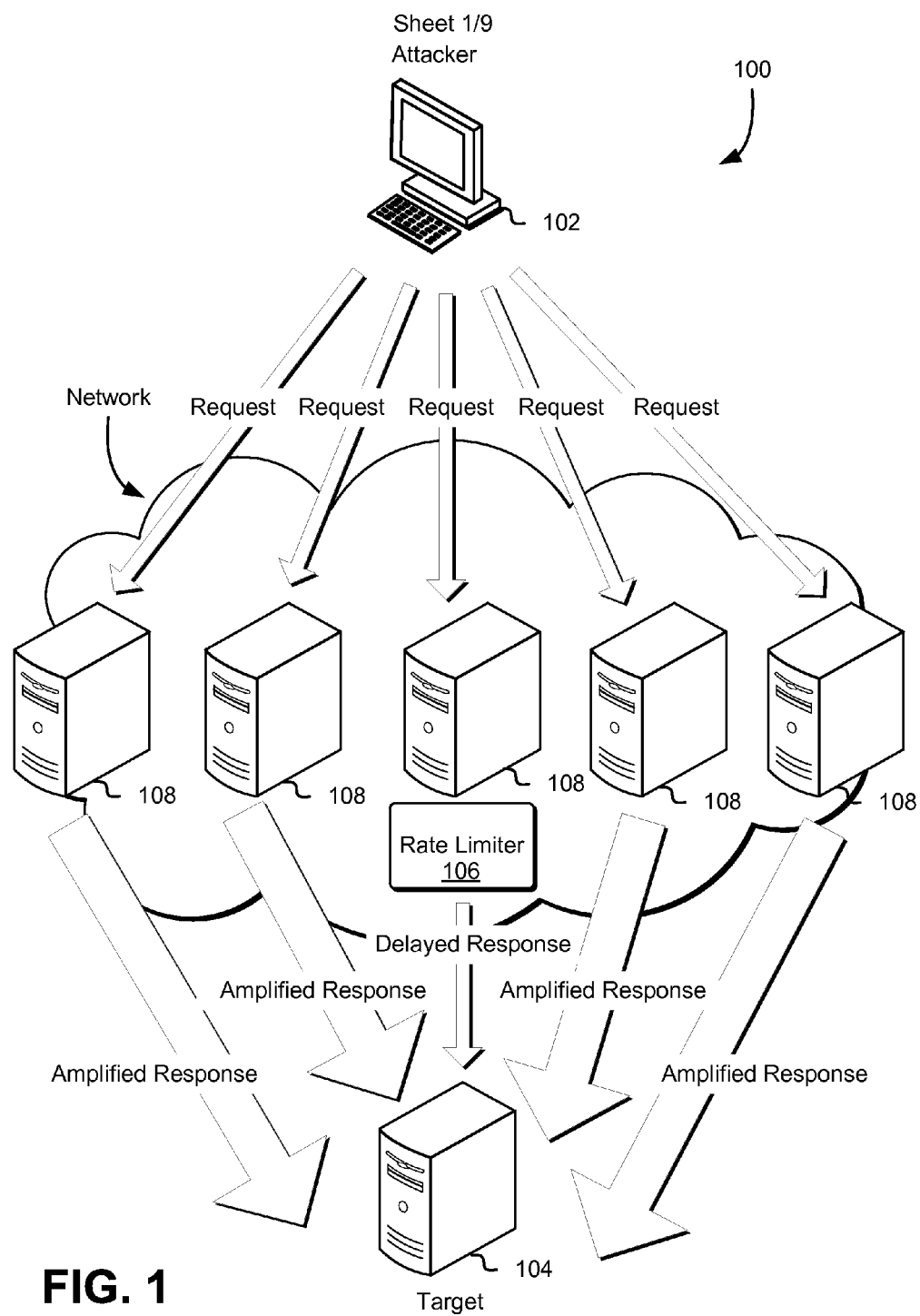
FIG. 1 illustrates an environment in which an amplification attack may be altered at least in part by a response rate limiter connected to networked computing resources in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to a response rate limiting device suitable for deterring amplification attacks using computing resources of a computing resource service provider. Computing resource service providers may provide applications to customers which allow customers to transmit requests to the applications and receive responses from the applications. Depending on the application and the types of responses provided by the application, attackers may attempt to use the computing resource service provider for various different types of attacks on targets, such as amplification attacks. Amplification attacks may include, for example, a DNS amplification attack which relies on the use of publicly accessible open DNS servers to overwhelm a target computer system with DNS response traffic. Attackers use amplification attacks to increase a volume of traffic included in an attack. In the DNS amplification attacks, the attacker uses an extension to the DNS protocol (EDNS0) that enables large DNS messages. The attacker composes a DNS request message of approximately 60 bytes to trigger delivery of a response message of approximately 4000 bytes to the target. The resulting amplification factor, approximately 70:1, significantly increases the volume of traffic the target receives, accelerating the rate at which the target's resources will be depleted. The rate limiting device, described in greater detail below, may be connected to a network bridge or other networking component of the computing resource service provider. Furthermore, the rate limiting device may be configured to delay response traffic as it travels over the network bridge. This delay may reduce the volume of response traffic directed to the target as a result of the attacker's request. Additionally, attackers may choose to utilize another application of a different computing resource service provider due to the reduction of volume in traffic resulting from the delay introduced by the rate limiting device.

This delay may cause the attacker to send the request to another computing resource service provider or attack the victim directly. In order to determine which responses to delay, the rate limiter may maintain a buffer configured to associate responses with corresponding requests. For example, if the attacker transmits a request for the current time, the rate limiter may be configured to associate the response including the current time with the request for the current time. Furthermore, the buffer may be implemented as a table of source addresses and scores associated with each source address. The scores may reflect a disparity for the particular source address in the amount of data transmitted by the source to the application to the amount of data transmitted by the application in response to the request received from the source address. For example, if the source address provides 1000 bytes in the form of requests to the application implemented by the computing resources service provider and the response associated with that source address is 1000 bytes, the disparity is zero and the score associated with that address may be zero as well.

To configure the buffer, an application may provide predictive instructions as part of a configuration of the rate limiter or component thereof such as a predictor described in greater detail below. The predictive instructions may include executable code that, when executed by a processor of the predictor, causes the predictor to determine a response address based at least in part on a request. The predictor may associate types of responses to source addresses and/or uses of the applications offered by the computing resource service provider. For example, if the computing resource service provider offers 3 applications but only 1 of the three applications provides a disparity in terms of the size of the response to the size of the request, the predictor may be configured to only monitor the 1 application which provides the disparity based at least in part on the predictive instructions. The response addresses and the source addresses may be network addresses which may include an identifier for a node or network interface of a particular network and the identifier may be unique for the particular network.

The rate limiting device may update the buffer based in least in part on requests received at the application. The request may travel across the network bridge as the requests are routed to the application. The rate limiting device may obtain information from the requests as the requests travel across the network bridge. The predictor or other component of the rate limiting device may determine, based at least in part on the obtained information, identifying information for the request suitable for updating the buffer with the information obtained from the request. For example, the predictor may determine a source address associated with the request and, as a result, the rate limiting device may update a score contained in a record stored in the buffer corresponding to the source address. Furthermore, as responses are transmitted by the application and travel across the network bridge a delayer or other component of the rate limiting device may determine to delay the response based at least in part on information contained in the buffer. For example, the rate limiting device may determine a source address corresponding to the response and determine the score associated with the source address contained in the buffer. The delayer may then determine, based at least in part on the score, whether to delay the response. If the response is delayed, it may appear to the application as if there is congestion on the network and therefore the application may perform various operations in response to congestions, such as delaying and/or dropping responses.

FIG. 1 illustrates an environment 100 in which an attacker 102 may utilize computing resources 108 of one or more computing resource service providers in order to amplify an attack against a target 104. At least one of the computing resources 108 may be connected to or otherwise include a rate limiting device 106. The rate limiting device 106 may be configured to determine responses generated by the computing resources 108 that may be a part of the attack and delay the response. The computing resources 108 may include a variety of different computing resources accessible to the attacker 102. For example, the computing resources 108 may include server computer systems implementing an open DNS server as described above. The computing resources 108 may implement an application provided by the computing resource service provider to user and/or customers of the computing resource service provider. For example, the application may include a date and time service; users may transmit requests to the application for the current date and time. The requests may include a command, application programming interface (API) call, remote procedure call (RPC) or other instruction configured to cause a service of the computing resources service provider to perform various functions. The computing resources 108 implementing the date and time service may then transmit a response to the request including the current date and time. As used herein, unless otherwise stated or clear from context, the term "service" may be understood to be a computer system program, process, client, server, application, module, operating system entity, controlling domain, communication node or collection of these and/or other such computer system entities. A "service" may be a client and/or a server and in some embodiments may be configured to send and/or receive communications, data, requests and/or other such requests from other services within the computer system.

In various embodiments, the attacker 102 transmits a plurality of requests to a plurality of computing resources of various computing resources service providers. The request may indicate that the responses to the request are to be directed to the target 104 of the attack. The target 104 may then receive a plurality of responses which may consume computing resources of the target 104. As illustrated in FIG. 1, the rate limiting device 106 may delay at least a portion of the response thereby reducing the volume of traffic directed to the target 104. As a result, the attacker 102 may determine to no longer use the application connected to the rate limiting device 106 due to the reduction in the volume of traffic transmitted by the application. As shown in FIG. 1, the attacker 102 may communicate with the computing resources 108 of the computing resource service providers through a network, whereby the network may be a communication network, such as the Internet, an intranet or an Internet service provider (ISP) network. Some communications from the attacker 102 to the computing resource service providers may cause the computing resources 108 to operate in accordance with one or more embodiments described herein or a variation thereof. For example, the communications from the attacker 102 may cause the computing resources to transmit amplified responses, as described above, to the target 104.

The types of attacks described herein incur costs for the computing resources 108 processing the request and providing the responses by utilizing resources that may otherwise be utilized to process requests not associated with the attack. In addition, during the attack, the responses provided by the computing resources 108 may cause damage to the target 104 computer system. The computing resource service providers may wish to reduce costs by making the computing resources 108 and applications implemented by the computing resource 108 less attractive for attackers 102. However, modifying the applications implemented by the computing resources 108 processing the requests may be difficult or impractical for an interval of time. The rate limiting device 106 mitigates the effects of attacks on the computing resources 108 without modifying the applications implemented by the computing resources 108. The rate limiting device 106 may also operate as a rate limiting service provided by the computing resource service provider operating the computing resources 108. In various embodiments, the rate limiting device 106 is a network bridge configured to include a ring buffer memory and computer executable instructions configured to mitigate attacks performed by the attacker 102.

The rate limiting device 106 may receive computer executable instructions operable to predict a response address for an inbound packet associated with a request. The executable instructions may be provided by the computing resource service provider and may correspond to the request and response of the application implemented by the computing resources 108. The rate limiting device 106 may then receive a request, the request may comprise one or more inbound packets including corresponding to the request. By executing the computer executable instructions the rate limiting device may predict a response address for at least one of the one or more packets. The rate limiting device 106 may then locate the score associated with the response address in a buffer maintained by the rate limiting device 106. The score may be decreased based at least in part on the number of inbound packets corresponding to the request and a size of the inbound packets (e.g., total number of bytes of the inbound packets) corresponding to the request. Inbound packets and/or an amount of data received at the rate limiting device may cause the rate limiting device to decrease the score associated with the response address.

The rate limiting device 106 may be further configured to receive a response comprising one or more outbound packets and determine the response address associated with the one or more outbound packets. The rate limiting device 106 may then increase the score associated with the response address based at least in part on the number of outbound packets and/or the size of the outbound packets. Once the score has been updated, the rate limiting device 106 may determine a rate at which the response is to travel over a component of the network, such as a network bridge, router or other routing component, switch, firewall, software defined network appliance, or other component of the network configured to forward packets. The rate limiting device 106 may determine the rate based at least in part on the score. For example, if the score is above a threshold the score may indicate that the request is associated with the attack on the target 104 and may decrease the rate at which the response travels over the network bridge. The network bridge may then transmit the one or more outbound packets corresponding to the response at the determined rate. Furthermore, the rate limiting device may be configured to age at least a portion of entries in the buffer by decaying at least a portion of the scores included in the buffer.

Figure 2:
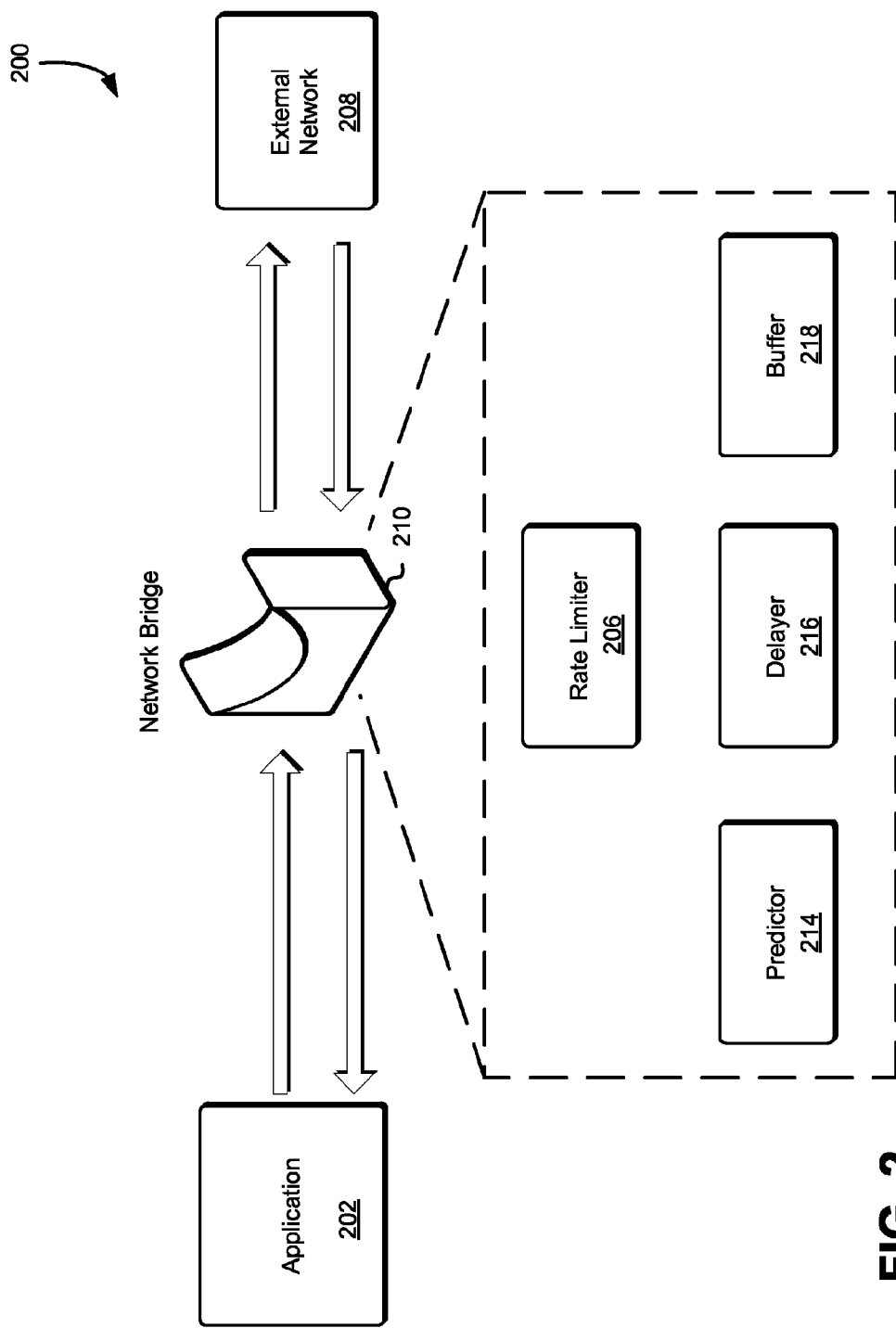
FIG. 2 illustrates an environment in which a rate limiter is connected to a network bridge in accordance with an embodiment.

FIG. 2 illustrates an environment 200 in which a rate limiting device 206 is connected to a network bridge 210 in accordance with an embodiment. The network bridge 210 may be a network device that connects multiple network segments. For example, in the Open Systems Interconnection (OSI) model the network bridge may act at the first two layers, below the network layer to transmit data, such as packets, between two networks. As illustrated in FIG. 2 the network bridge 210 may connect an external network 208 to an application 202. The application 202 may be implemented by one or more computer systems of an organization, such as a computing resource service provider, connected by an internal network (not shown in FIG. 2 for simplicity). The external network 208 may be a communication network, such as the Internet, an intranet or an Internet service provider (ISP) network as described above. The network bridge 210 may include a rate limiting device 206. As described above, the rate limiting device 206 may be configured to delay responses or packets corresponding to the responses as data is transmitted over the network bridge 210. The rate limiting device 206 may include a processor and memory, the memory including executable instructions for performing the various function described herein. The delay may be a variable rate at which the packets or responses are transmitted by the network bridge 210 from one end of the connection between the network segments to the other end. The rate limiting device 206 may include various components configured to enable the rate limiting device 206 to monitor responses and requests as well as determine the variable delay to apply to the responses if any. The various components may include a predictor 214, a delayer 216, and a buffer 218.

The predictor 214 may include a set of computer executable instructions operable to predict a response address for a packet received at the network bridge. Furthermore, the predictor 214 may include a processor and memory, the memory including executable instructions for performing the various function described herein, the predictor 214 may be a component of the rate limiting device 206 or may be a separate device. The computer executable instructions may be provided to the rate limiting device 206 and/or predictor 214 during an initialization or configuration of the rate limiting device 206. The computer executable instructions may be configured such that, when executed by one or more processor of the rate limiting device 206, cause the rate limiting device 206 and/or predictor 214 to determine identification information for packets received at the network bridge suitable for updating records contained in the buffer 218. For example, the predictor 214 may determine a sequence number or response address associated with packet so that the buffer 218 may be updated with information corresponding to the packet, such as a size of the packet. The buffer 218 may contain a set of records containing identification information obtained by the predictor 214 from packets received at the network bridge 210 and a score associated with the identification information. In various embodiments, the buffer 218 is configured as a circular buffer that uses a single, fixed-size buffer as if it were connected end-to-end in order to process data streams associated with the network bridge 210.

Returning to FIG. 2, the rate limiting device 206 may further include the delayer 216. The delayer 216 may be configured to determine a delay to apply to responses received at the network bridge 210 based at least in part on information contained in the buffer 216. For example, the rate limiting device 206 may determine that a response has been received at the network bridge 210 and determine, based at least in part on information provided by the predictor 214, an identifier associated with the response. Furthermore, the delayer 216 may include a processor and memory, the memory including executable instructions for performing the various function described herein, the delayer 216 may be a component of the rate limiting device 206 or may be a separate device. The delayer 216 may then determine a score associated with the identifier based at least in part on a record corresponding to the identifier contained in the buffer 218. If the score is above a threshold the delayer 216 may cause the rate limiting device to delay the response as it travels over the network bridge 210. The delay may be variable based on an amount the score is over the threshold. For example, if the score is a small amount over the threshold the delay may be minimal but as the score increases over the threshold the delay may be increased. Additionally, the scores contained in the buffer may be configured to decay or otherwise decrease over time. For example, the scores may be configured such that at the expiration of an interval of time the score is reduced by a determined amount, such as half the value of the score.

Figure 3:
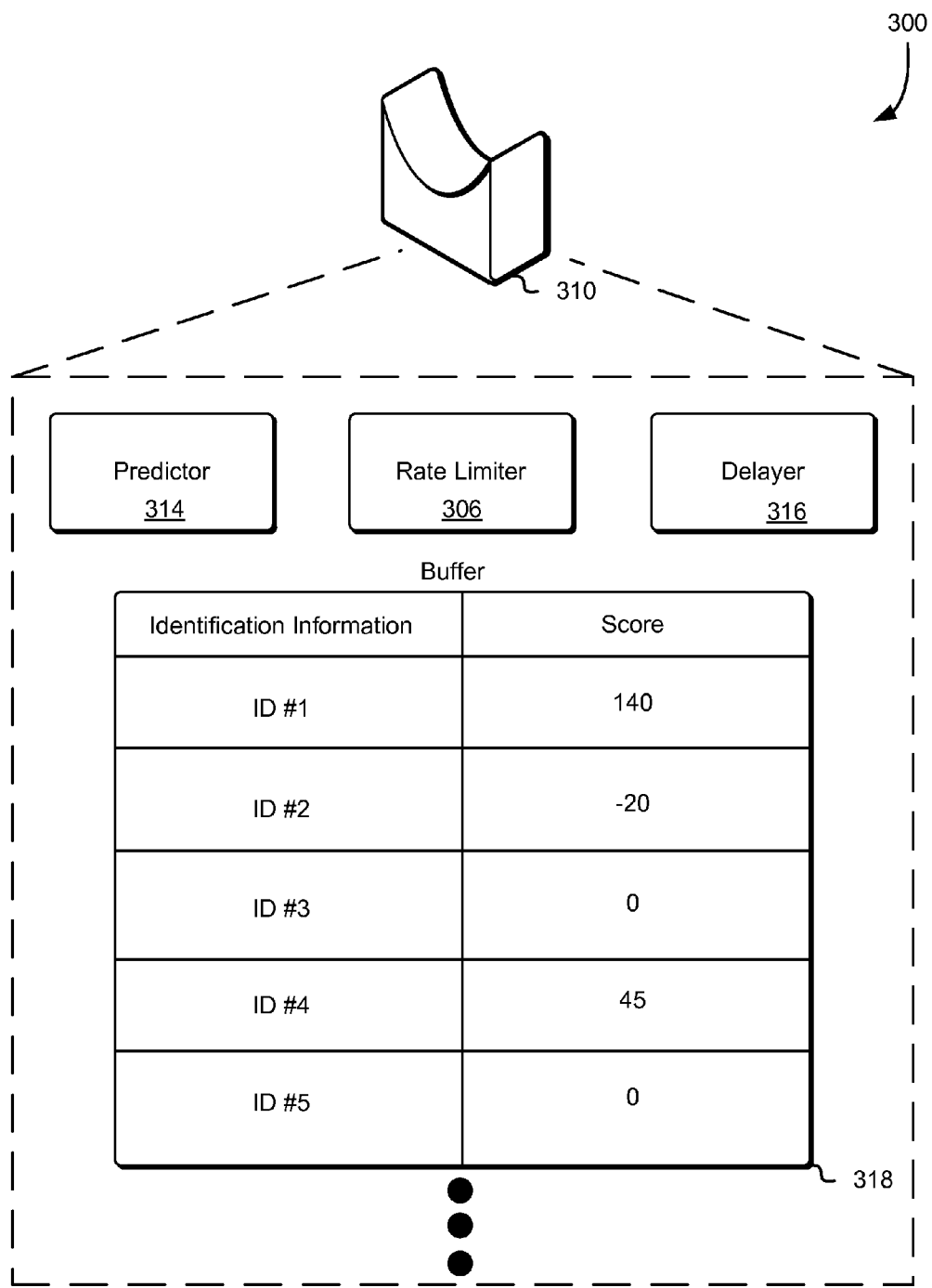
FIG. 3 illustrates an environment in which a rate limiter is configured to maintain a buffer in order to determine responses to delay in accordance with an embodiment.

FIG. 3 illustrates an environment 300 in which a rate limiting device 306 connected to a network bridge 310 contains a buffer 318 in accordance with an embodiment. As described above, the buffer 318 may be configured to contain a set of records associating identification information with scores. The identification information may be obtained from data received at the network bridge 310. For example, the information may be obtained from a header of a packet received at the network bridge 310 and detected by the rate limiting device 306. The buffer 318 may be configured to segregate or otherwise differentiate traffic to and from the application based on the content of data received at the network bridge 310. For example, the buffer 318 may contain a set of buckets associated with a response address and a score representing the difference between the amount of data, associated with the response address, received at the application and the amount of data, associated with the response address, transmitted by the application.

Furthermore, the identification information contained in the buffer 318 partitioned, sub-partitioned, or otherwise organized based at least in part on other information contained in the data received at the network bridge 310. For example, the identification information may include a response address further organized into types of requests that may be processed by the application. The types of requests may correspond to functions or services provided by the application. The application may provide a time service as well as a DNS service as described above. The buffer 318 may be organized such that a particular response address is associated with a score for requests corresponding to the time service and a score for requests corresponding to the DNS service. The score may represent a disparity in the amount of traffic transmitted by the application and the amount of requests received by the application. The score may be calculated using various information obtained by the rate limiting device 306. For example, in various embodiments, the score corresponds to the number of bytes transmitted to the response address. In another example, if the response size is similar or consistent, the buffer may be configured to simply track the number of responses transmitted across the network bridge 310.

The buffer 318 may be configured to receive information from the rate limiting device 306 corresponding to request and responses traveling across the network bridge 310. The information may include identification information and information configured to enable the buffer to update the score associated with the identification information. The information configured to enable the buffer 318 to update the score may include a variety of different information obtained from the inbound packets as they travel across the network bridge 310. For example, the information may include a size, in bytes, of the inbound packet. The score in the buffer 318 may decrease based at least in part on the size of the inbound packets received associated with the identification information. When a response is received at the network bridge 310, the size of the outbound packets may be added to the score. In another example, the information may be simply that an inbound packet was received and the score may simply reflect a number of requests and/or responses associated with particular identification information. Furthermore, the score may be configured to decrease over an interval of time, as described above. For example, the buffer 318 may be configured to divide the score by 2 every 5 minutes. The score may be reduced exponentially, linearly, or other means suitable to reduce the score over an interval of time.

In various embodiments, receiving a request or transmitting a response may reset the interval of time such that the score is only decreased if no request or response, associated with the identification information, is received at the network bridge 310 over the interval of time. The rate limiting device 306 may be configured to segregate content (e.g., packets received at the network bridge 310) by at least using content sensitive filtering of content based at least in part on predictive instruction, described in greater detail below. The content may be segregated by a source or destination address associated with packets or other information associated with the packets. This information may be used to organize the buffer 318 into records containing identification information and an associated score. Furthermore, the buffer 318 may be configured to age off packets and thereby reduce the score associated with the packets. For example, a value corresponding to a packet (e.g., the size in bytes of the packet) may be deducted for the score contained in the buffer 318 after an interval of time has elapsed since the packet was received at the network bridge 310.

Figure 4:
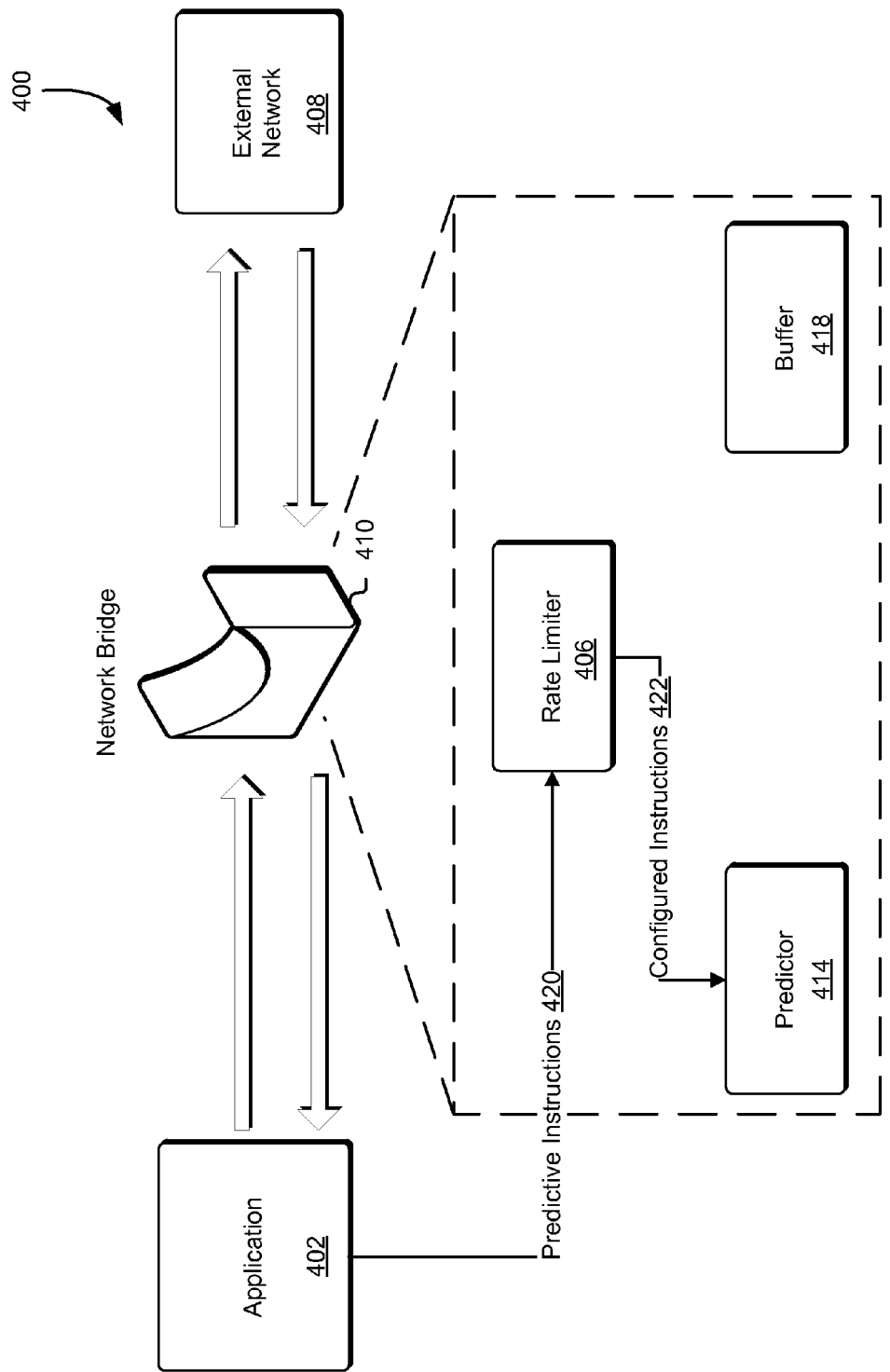
FIG. 4 illustrates an environment in which a predictor of a rate limiter may be configured in order to associate requests with corresponding responses in accordance with an embodiment.

FIG. 4 illustrates an environment 400 in which a rate limiting device 406 connected to a network bridge 410 may be configured with predictive instructions 420 in accordance with an embodiment. As illustrated by FIG. 4, the network bridge 410 may connect an application 402 to an external network 408. The computing resource service provider or other entity responsible for providing the application 402 may provide the application 402 with the predictive instructions 420. The application 402 may then be configured to provide the predictive instructions 420 to the rate limiting device 406. In various embodiments, the computing resource providers configures the rate limiting device 406 with the predictive instructions 420. For example, the rate limiting device 406 may receive predictive instructions 420 comprising computer executable instructions operable to predict a response address for an inbound packet. The predictive instructions 420 may include executable code configured to enable the predictor 414 to associate requests with responses as they travel across the network bridge 410. For example, the predictor 414 may associate types of responses to source addresses and/or requests to destinations addresses. In another example, the predictor 414 may associate types of uses of the applications offered by the computing resource service provider to the identification information contained in the buffer 418.

The rate limiting device 406 may use the received predictive instructions 420 to configure the predictor 414 with configured instructions 422. The configured instructions 422 may enable the predictor 414 to determine identification information for packets received at the network bridge 410. In various embodiments, the rate limiting device 406 received the predictive instructions 420 and modified the predictive instructions 420 to create configured instructions 422 that are executable by the predictor 414. In yet other embodiments, the rate limiting device 406 may simply provide the predictive instructions 420 to the predictor 414. The determined identification information may be used to update the buffer 418 described in greater detail above. When packets are received at the network bridge 410 the predictor 414 may execute the predictive instructions 420 or, in some embodiments, the configured instructions 422, as a result of executing the instructions the predictor may determine identification information associated with the packets. The identification information may be obtained from the headers of the packets received at the network bridge 410.

Figure 5:
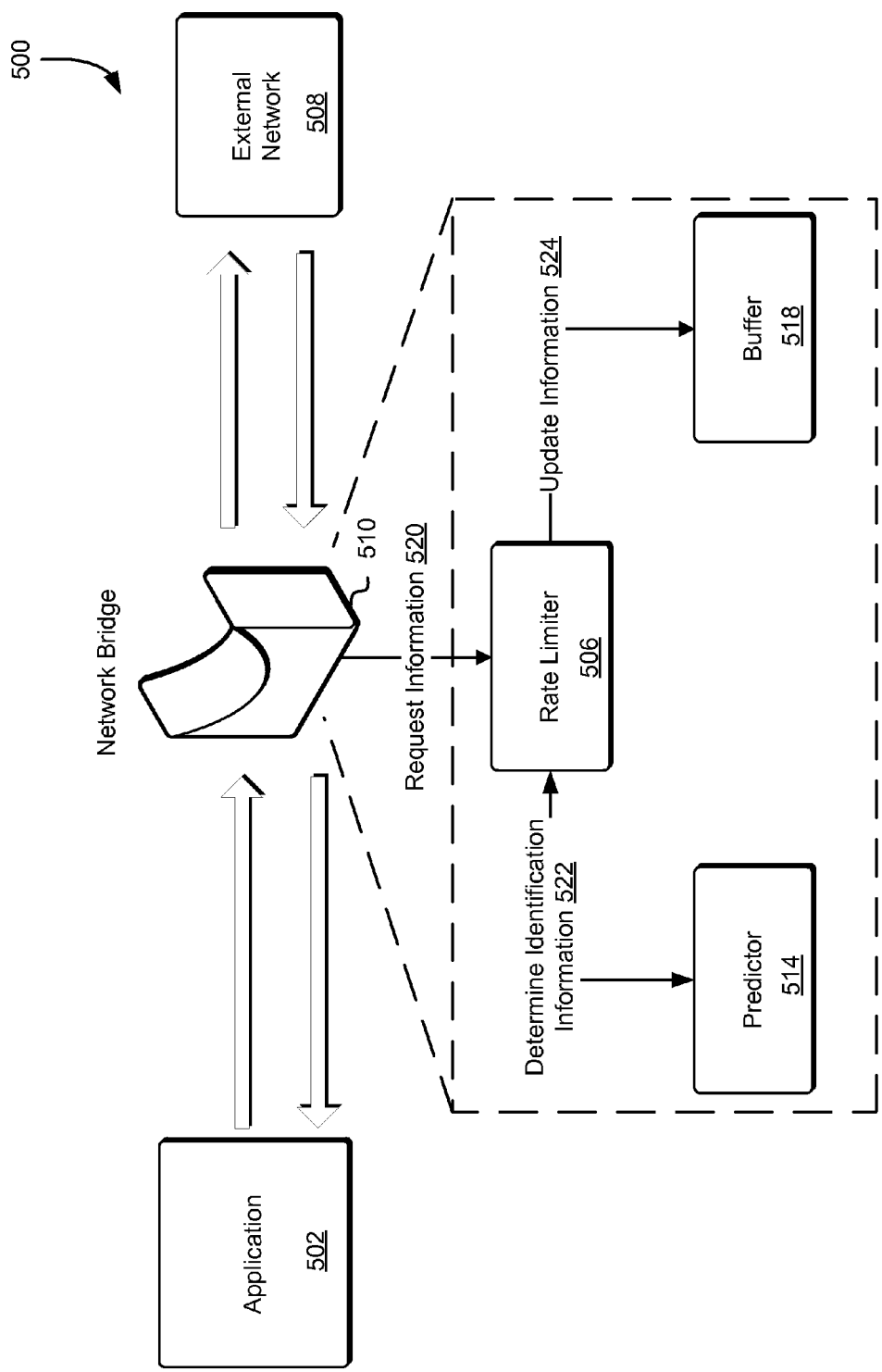
FIG. 5 illustrates an environment in which a rate limiter may update a buffer with request information in accordance with an embodiment.

FIG. 5 illustrates an environment 500 in which a rate limiting device 506 connected to a network bridge 510 may update a buffer 518 based at least in part on information received at the network bridge 510 in accordance with an embodiment. As illustrated by FIG. 5, the network bridge 510 may receive a request from an external network 508. The request may be directed to an application 502 operated by a computing resource service provider. The request may comprise one or more inbound packets received from a source. The rate limiting device 506 may obtain request information 520 as the request travels across the network bridge 510. The predictor 514 may determine, based at least in part on the obtained request information 520, identification information associated with the request.

The determine identification information 522 may be used by the rate limiting device 506 to update the buffer 518. The rate limiting device 506 may determine update information 524 to update the buffer 518 based at least in part on the request information 520 and the determine identification information 522. For example, the predictor 514 may determine a destination address associated with the request information 520. The predictor 514 may provide the rate limiting device 506 with the determined destination address and the rate limiting device 506 may determine update information 524 associated with the determine destination address and the request information 520. For example, the request limiting device 506 may determine the size of the request information 520 or number of packets included in the request information 520. The determined size information may be used to update the score contained in the buffer 518. For example, the size of the request information 520 may be 100 bytes, the rate limiting device 506 may then update a record contained in the buffer 518 associated with the determine identification information 522 and decrease the score by 100.

Figure 6:
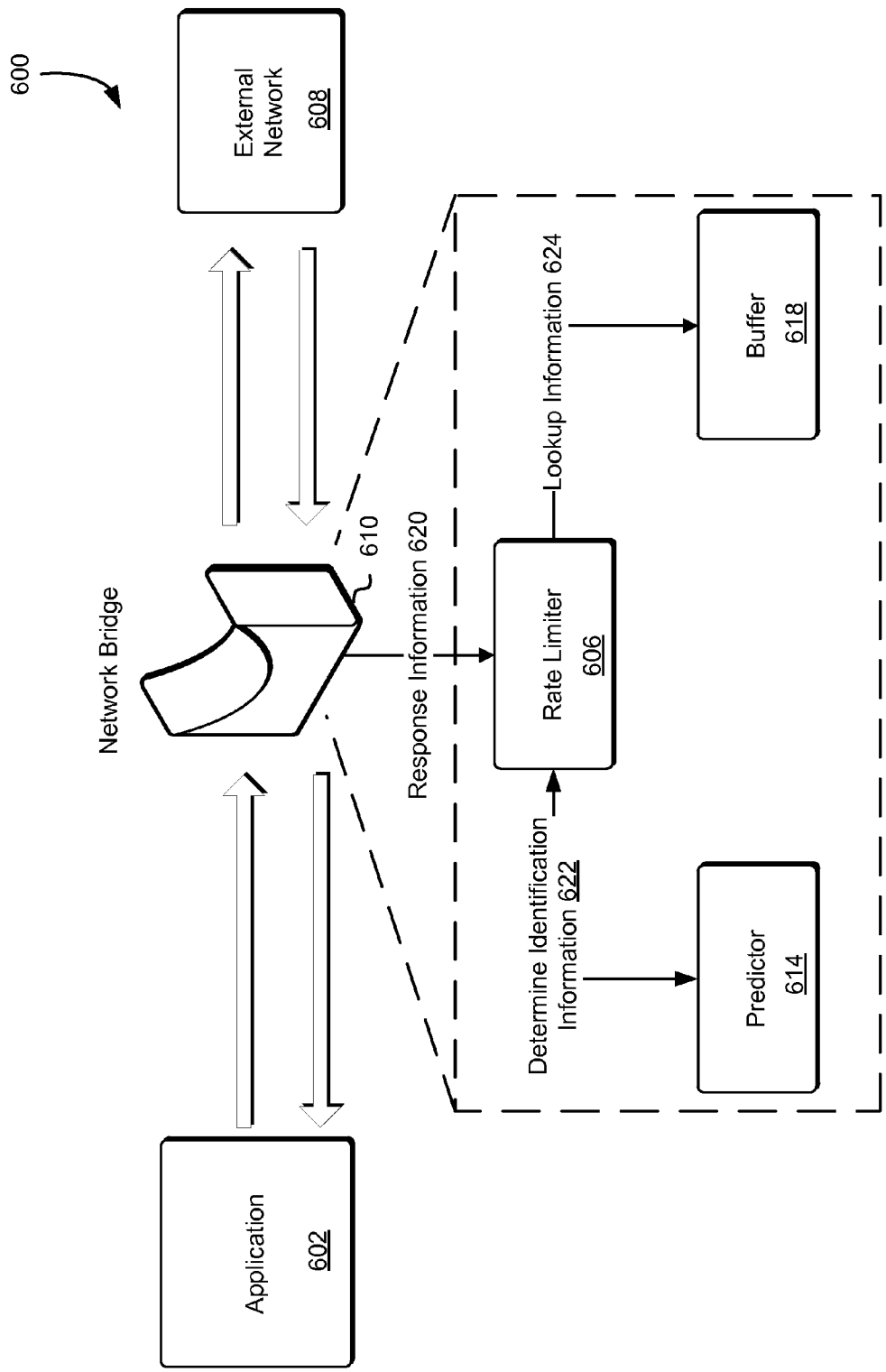
FIG. 6 illustrates an environment in which a rate limiter may determine to delay a response based at least in part on information contained in a buffer in accordance with an embodiment.

FIG. 6 illustrates an environment 600 in which a rate limiting device 606 connected to a network bridge 610 may determine information associated with a response received at the network bridge 610 based at least in part on information contained in a buffer 618 in accordance with an embodiment. A response from an application 602 may be received by the network bridge 610. The response may be directed to an external network 608. The response may correspond to a request received at the application 602 as described above. The response may comprise one or more outbound packets directed to a destination address. The rate limiting device 606 may be configured to obtain response information 620 from responses received at the network bridge 610. In various embodiments, the obtained response information 620 includes information obtained from the headers of outbound packets transmitted by the application 602 across the network bridge 610 to the external network 608.

The rate limiting device 610 utilizes the obtained response information 620 to determine lookup information 624, such as a score, contained in the buffer 618 associated with the obtained response information 620. In order to determine the lookup information 624, the rate limiting device 606 may obtain identification information from the predictor 614. The predictor 614 may utilize the predictive intrusion, described in detail above, to determine identification information based at least in part on the obtained response information 620. The determined identification information 622 may be used by the rate limiting device 606 to determine lookup information 624 from the buffer 618. As described above, the buffer 618 may contain a set of records containing at least identification information and associated score. For example, the predictor 614 may determine a destination address associated with obtained response information 620. The rate limiting device 606 may look up the score associated with the destination address. The determined score may be provided to a delayer, described in greater detail below, in order to determine whether to delay the response as it travels across the network bridge 610.

Additionally, the rate limiting device may obtain update information from the obtained response information 620 and update the score in the buffer 618 accordingly. For example, if a packet corresponding to the response contained 1000 bytes, the rate limiting device 606 may add 1000 to the score associated with the destination address determined by the predictor 614. As described above, other mechanisms may be used for calculating the score associated with the identification information, for example, if the responses are approximately equal in size a determined value may be added to the score for every response and/or packet received at the network bridge 610 associated with the destination address.

Once the rate limiting device 606 obtained the determined identification information 622 from the predictor 614, the rate limiting device 606 may lookup information from the buffer 618. The rate limiting device 606 may query the buffer 618 based at least in part on the determine identification information 622. The buffer 618 may then return score information associated with the determined identification information 622. For example, the rate limiting device 606 may obtain the destination address associated with the request from the predictor 614. The rate limiting device 606 may then determine the score associated with the destination address contained in the buffer 618. The rate limiting device 606 may then update the score based at least in part on information obtained from the response and provide the score to a delayer, described in greater detail below, in order to determine whether to apply a delay rate to the response as it travels across the network bridge 610 to the external network 608.

Figure 7:
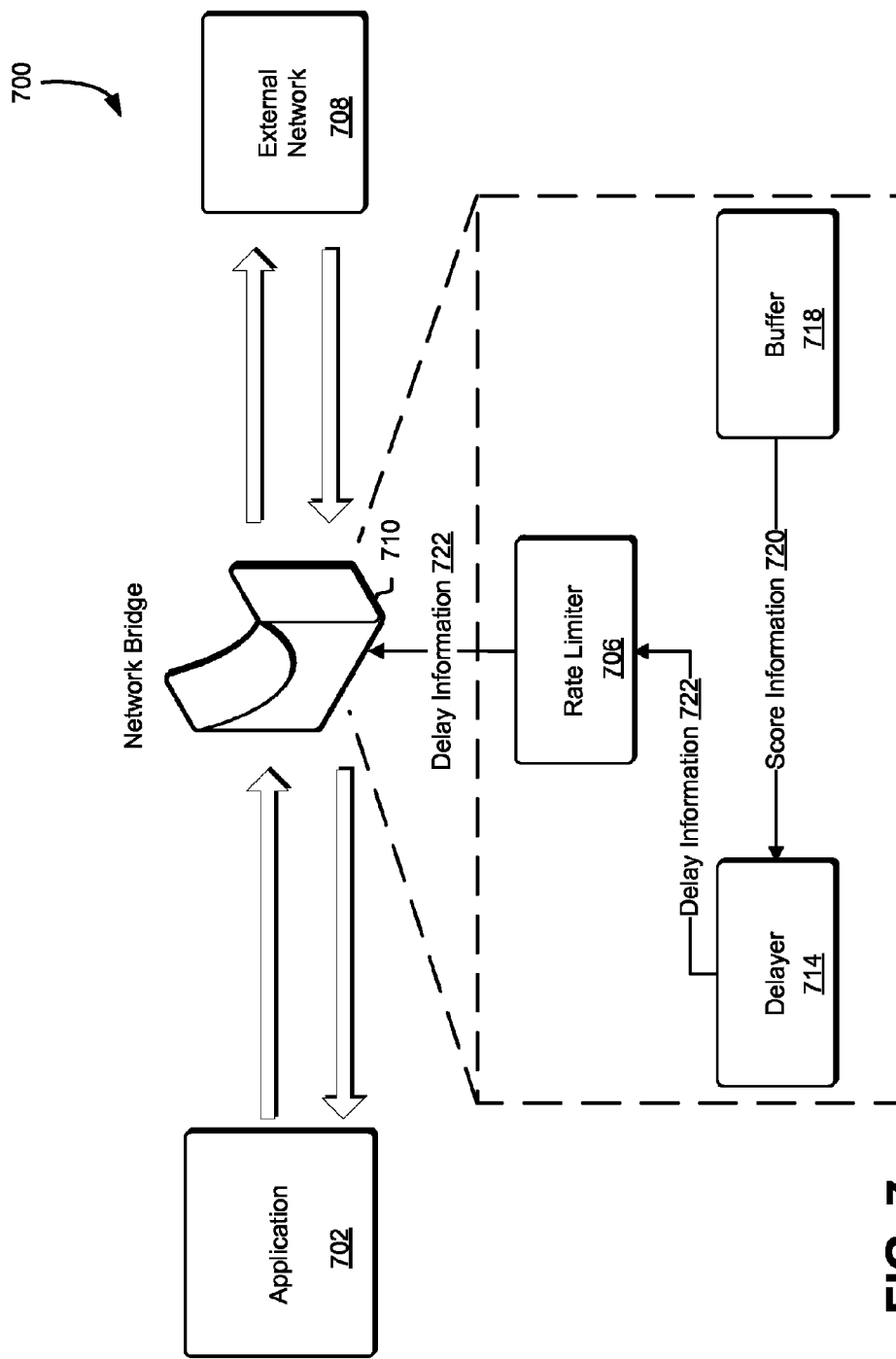
FIG. 7 illustrates an environment in which a rate limiter may determine to delay a response based at least in part on information obtained from a delayer in accordance with an embodiment.

FIG. 7 illustrates an environment 700 in which a rate limiting device 706 connected to a network bridge 710 may determine to delay a response across the network bridge 710 based at least in part on information contained in a buffer 718 in accordance with an embodiment. As described above the buffer 718 may contain a set of scores associated with response and/or request received at the network bridge 710. When a response from an application 702 is received at the network bridge 710 the rate limiting device 706 may obtain identification information from the response. For example, as described above, the rate limiting device 706 may determine a destination address for the response. The response may include one or more outbound packets generated by the application 702 and may be directed to an external network 708.

The rate limiting device 706, as described above in connection with FIG. 6, may use the identification information to determine a score associated with the response. Score information 720 may then be provided to a delayer 714. The delayer 714 may include logic or other executable instructions that, when executed by the rate limiting device 706, determine delay information 722 for response (e.g., outbound packets corresponding to a response generated by the application 702) received at the network bridge 710. The delay information 722 may include a variable delay duration to be placed on outbound packets as they travel across the network bridge 710. The delay may be applied directly by the network bridge 710 and may correspond to the rate at which the outbound packets are forwarded from one end of the network bridge 710 to the other end of the network bridge 710. The delayer 714 may determine the delay information 722 based at least in part on the score information 720 obtained from the buffer 718. If the score information 720 indicates a disparity in the amount of data received by the application 702 to the amount of data transmitted by the application 702 corresponding to identification information this may indicate that the application is being utilized in an amplification attack. If the score information 720 does not indicate a disparity, the delay information 722 may indicate to the rate limiting device 710 not to delay the response and, as a result, the rate liming device 706 may not provide the delay information to the network bridge 710.

As a result, the delayer 714 may determine a delay to be applied to the data associated with the identification information. The delay may be variable such that if the score information 720 increases the delay applied to the responses increases as well. Furthermore, the delay placed on the responses may appear to the application 702 as if there is congestion on one or more networks connected to the application 702. The application 702 may then take mitigating actions in response to the apparent network congestion. A variety of different techniques may be employed by the application 702 to mitigate network congestion. For example, the application 702 may drop requests as a result of the apparent congestion on the network. Furthermore, the delay placed on the outbound packets may reduce the volume of data transmitted to the destination address for a particular interval of time. Returning to FIG. 7, if the score information 720 obtained by the delayer 714 is above a threshold, the delayer may determine to delay the response. The delayer 714 may generate delay information 722 based at least in part on the score information 720. As described above, the delay information 722 may indicate a rate at which the network bridge 710 is to transmit data corresponding to the response. The rate limiting device may provide the delay information 722 to the network bridge 710 which may then set the rate at which the response travels across the network bridge 710 according to the delay information 722.

Figure 8:
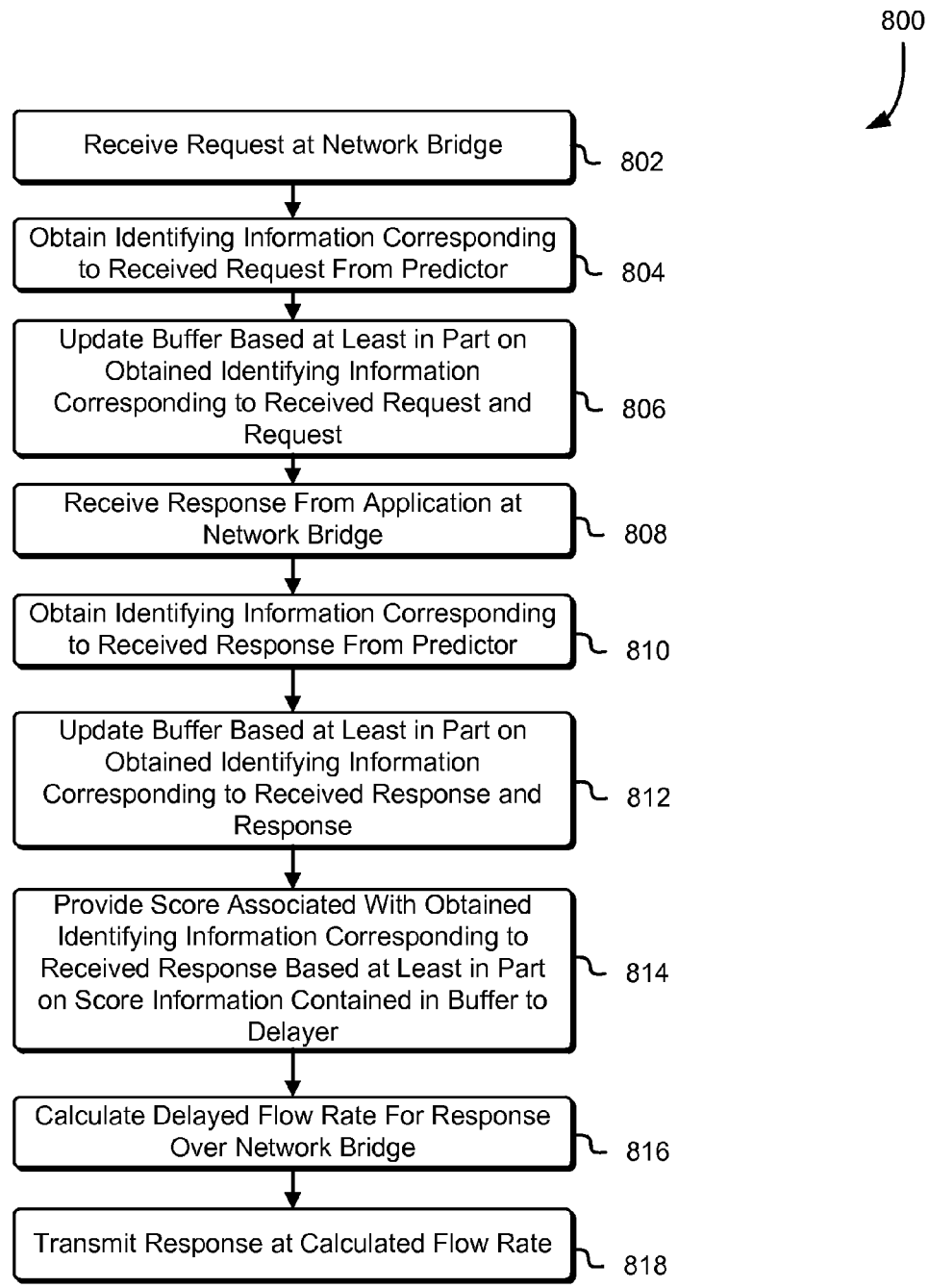
FIG. 8 is an illustrative example of a process for determining, by a rate limiter, whether to delay a response over a network bridge in accordance with an embodiment.

FIG. 8 shows an illustrative example of the process 800 which may be used to mitigate certain aspects of an amplification attack by at least delaying a portion of the traffic involved in the amplification attack. The process 800 may be performed by any suitable system such as the rate limiting device and components thereof described above in connection with FIG. 2. Returning to FIG. 8, in an embodiment, the process 800 includes receiving a request at a network bridge 802. The request may include one or more inbound packets and may be a request to interact with an application implemented by a computing resource service provider. The network bridge may be configured to allow the rate limiting device to obtain information for the inbound packet or other packets received at the network bridge. Furthermore, the rate limiting device may be to perform various content sensitive operations such as segregating traffic based at least in part on the content of the traffic, such as a type of request or information included in the request. The rate limiting device may then obtain identifying information corresponding to the received request from a predictor 804. The predictor may be a component of the rate limiting device including computer executable instructions operable to predict a response address for an inbound packet. The received requests, at the network bridge, may comprise a number of inbound packets containing the response address. For each inbound packet the rate limiting device may cause the predictor to perform the computer executable instructions, included in the predictor, in order to determine the response address for each inbound packet.

The rate limiting device may then update a buffer based at least in part on the obtained identification information corresponding to the received request and the request 806 or information associated with the request. For example, the rate limiting device may locate a score for the response address in the buffer and decrease the score based at least in part on the number of inbound packets associated with the request and/or the size of the inbound packets associated with the request. The rate limiting device may receive a number of responses and associated identification information without an intervening response transmitted by the application. However, at some point in time after receiving the request the rate limiting device may receive a response from the application at the network bride 808. The response may comprise a number of outbound packets as described above. Furthermore, the response may include identification information indicating that the response corresponds to a particular request. For example, the response may include the response address obtained from the request as described above.

The rate limiting device may then obtain identification information corresponding to the response from the predictor 810. As described above, the identification information corresponds to a request and may be operable to locate information in the buffer based at least in part on the identification information. The rate limiting device may then update the buffer based at least in part on the identification information corresponding to the response and the response 812 or information associated with the response. For example, the rate limiting device may utilize the identification information to locate the score for a destination address of the response contained in the buffer. The rate limiting device may then increase the score based at least in part on the number of packets and/or the size outbound packets. Once the score in the buffer has been updated, the rate limiting device may provide the score information obtained, from the buffer, to a delayer 814. The delayer may be configured to determine a flow rate for response traveling across the network bridge based at least in part on the score information.

The delayer may then calculate a delayed flow rate for the response as the response travels over the network bridge 816. For example, the delayer may determine if the score does not exceed a threshold, the calculated delayed flow rate to be zero and the response may be transmitted over the network bridge without a variation in the flow rate across the network bridge. If the score is below the threshold it may indicate that the response may not be part of an amplification attack the rate limiting device may enable the response to travel across the network bridge with no delay. If the score exceeds the threshold, the delayer may then calculate the delayed flow rate based at least in part on the obtained score. The rate limiting device may then provide the delayed flow rate to the network bridge. The network bridge may then transmit the one or more outbound packets at a rate not to exceed the response flow rate 818. In numerous variations to the process 800, the rate limiting device may age at least a portion of entries in the buffer by at least decaying response rate scores for the portion of entries towards zero.

Figure 9:
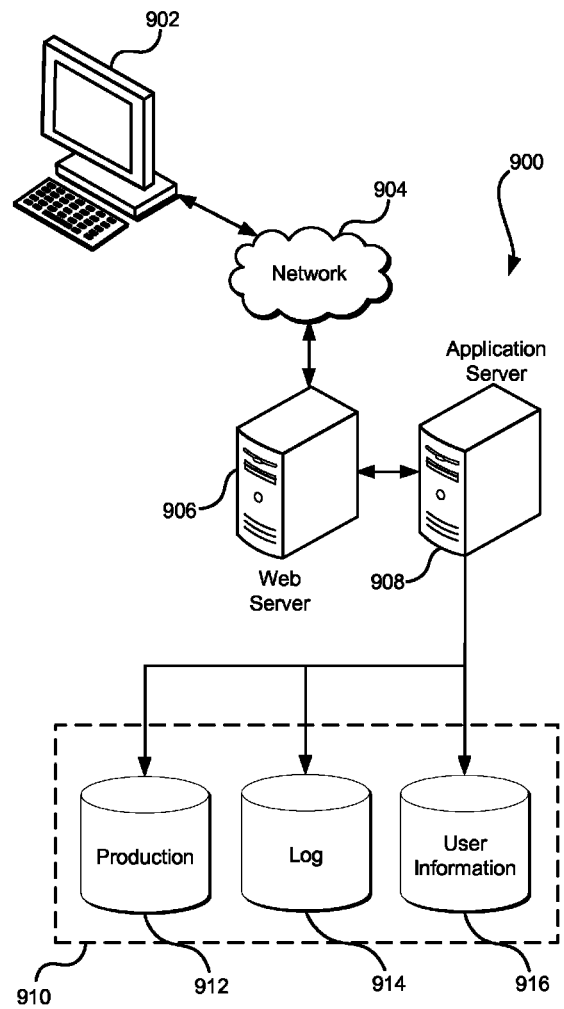
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one inbound device (e.g., a mouse, keyboard, controller, touch screen or keypad) and at least one outbound device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network inbound/outbound devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining computer executable instructions executable to determine network address information for a plurality of packets;
   receiving a set of inbound packets;
   determining a network address corresponding to the set of inbound packets by at least executing the obtained computer executable instructions;
   locating a score associated with the determined network address in a buffer;
   updating the score in the buffer based at least in part on a first size of the set of inbound packets;
   receiving a set of outbound packets;
   determining the set of outbound packets corresponding to the network address by at least executing the obtained computer executable instructions;
   locating the score associated with the determined network address in the buffer;
   updating the score in the buffer based at least in part on a second size of the set of outbound packets;
   determining a flow rate for the set of outbound packets based at least in part on the score;
   transmitting, across a network bridge, the set of outbound packets at a rate not to exceed the determined flow rate; and
   decaying the score by an amount at an expiration of an interval of time.

2. The computer-implemented method of claim 1, wherein updating the score further includes:
   decreasing the score by an first amount based at least in part on the first size of the set of inbound packets, where the first size corresponds to a number of bytes of the set of inbound packets; and
   increasing the score by an second amount based at least in part on to the second size of the set of outbound packets, where the second size corresponds to a number of bytes of the set of outbound packets.

3. The computer-implemented method of claim 1, wherein decaying the score further includes dividing the score by a number at the expiration of the interval of time such that the score decays towards zero.

4. The computer-implemented method of claim 1, wherein the buffer further includes a set of network addresses and corresponding set of scores, where each score in the set of corresponding scores represents a disparity between respective inbound packets to outbound packets.

5. A system, comprising:
one or more processors;
memory with instructions that, if executed by the one or more processors, cause the system to:
receive an inbound packet;
determine identification information corresponding to the inbound packet by at least executing computer executable instructions executable to determine the identification information;
update a score contained in a buffer based at least in part on the inbound packet;
receive an outbound packet;
update the score contained in the buffer based at least in part on the outbound packet; and
transmit the outbound packet in compliance with a flow rate determined based at least in part on the score.

6. The system of claim 5, wherein the memory further includes instructions that, if executed by the one or more processors, cause the system to decay the score after the expiration of an interval of time.

7. The system of claim 5, wherein the instructions that cause the system to determine the identification information corresponding to the inbound packet by at least executing the obtained computer executable instructions further include instructions that cause the system to determine a network address included in the inbound packet, where the executable instructions enable the system to determine the network address from a header included in the inbound packet.

8. The system of claim 5, wherein the instructions that cause the system to determine the flow rate further include instructions that cause the system to determine the flow rate based at least in part on the score.

9. The system of claim 5, wherein the instructions that cause the system to update the score in the buffer further include instructions that cause the system to:
determine a first size of the outbound packets and a second size of the inbound packet; and
adjust the score based at least in part on the determined first size and second size.

10. The system of claim 5, wherein the instructions that cause the system to determine the flow rate further include instructions that cause the system to determine the flow rate based at least in part on the score exceeding a threshold.

11. The system of claim 5, wherein the buffer further includes a set of records configured to associate identification information with scores, where the scores indicate a disparity between inbound packets and outbound packets corresponding to identification information included in the set of records.

12. The system of claim 5, wherein the inbound packet is associated with an application implemented by a computing resource service provider.

13. A non-transitory computer-readable storage medium having stored thereon executable instructions that, if executed by one or more processors of a computer system, cause the computer system to at least:
obtain identification information corresponding to an inbound packet;
update a score associated with the obtained identification information;
determine an outbound packet is associated with the inbound packet based at least in part on the obtained identification information;
update the score based at least in part on the outbound packet;
determine a delay rate to apply to the outbound packet based at least in part on the score; and
transmit the outbound packet at the delay rate.

14. The non-transitory computer-readable storage medium of claim 13, wherein the instructions further comprise instructions that, if executed by the one or more processors, cause the computer system to reduce the score towards zero at the expiration of a configured interval of time.

15. The non-transitory computer-readable storage medium of claim 13, wherein the instructions that cause the computer system to obtain identification information further include instructions that cause the computer system to execute a set of instructions configured to predict identification information from the inbound packet.

16. The non-transitory computer-readable storage medium of claim 13, wherein the instructions that cause the computer system to determine the delay rate to apply to the outbound packet further include instructions that cause the computer system to determine the delay rate is less than or equal to zero based at least in part on the score being below a threshold.

17. The non-transitory computer-readable storage medium of claim 13, wherein the instructions that cause the computer system to update the score associated with the obtained identification information further include instructions that cause the computer system to:
determine a value corresponding to the packet; and
adjust the score by at least the determined value.

18. The non-transitory computer-readable storage medium of claim 13, wherein the instructions that cause the computer system to transmit the response at the delay rate further include instructions that cause the computer system to delay the packet as the response travels across at least one of a network bridge, router, switch, firewall, load balancer, and software defined network appliance.

19. The non-transitory computer-readable storage medium of claim 15, wherein the instructions further comprise instructions that, if executed by the one or more processors, cause the computer system to obtain the set of instructions configured to predict identification information during an initialization operation of the computer system.

20. The non-transitory computer-readable storage medium of claim 15, wherein the instructions that cause the computer system to execute the set of instructions configured to predict identification information further include instructions that cause the computer system to determine a request associated with the inbound packet and a request associated with the outbound packet and the identification information is based at least in part on an identifier in the request or the response.

* * * * *